United States Patent

Grunther et al.

[15] 3,644,247

[45] Feb. 22, 1972

[54] ENCAPSULATING ELASTOMERIC COMPOUND

[72] Inventors: Robert G. Grunther, Crofton; Clarence K. Chatten, Annapolis; Alexander Lebovits, Baltimore, all of Md.

[73] Assignee: The United States of America as represented by the Secretary of the Navy

[22] Filed: Aug. 17, 1970

[21] Appl. No.: 64,664

Related U.S. Application Data

[63] Continuation-in-part of Ser. No. 731,278, May 22, 1968, abandoned.

[52] U.S. Cl. .................260/23.7 H, 260/23.7 B, 260/23.7 M
[51] Int. Cl. ..........................................................C08d 11/00
[58] Field of Search ....................260/23.7 H, 23.7 B, 23.7 M

[56] References Cited

UNITED STATES PATENTS

| | | | |
|---|---|---|---|
| 2,383,839 | 8/1945 | Beekley | 260/23.7 UX |
| 2,519,100 | 8/1950 | Baldwin | 260/85.3 |
| 2,964,493 | 12/1960 | Hakala et al. | 260/23.7 X |
| 3,055,857 | 9/1962 | Hawley et al. | 260/41.5 |

OTHER PUBLICATIONS

Alliger et al., " Vulcanization of Elastomers" (1964) page 251.

*Primary Examiner*—Donald E. Czaja
*Assistant Examiner*—Donald J. Barrack
*Attorney*—Richard S. Sciascia, Louis B. Applebaum and Ernest F. Weinberger

[57] ABSTRACT

An encapsulating compound for deep submergence use is a butyl and chlorobutyl copolymer containing reactive chlorine and having added thereto specific fillers, activators, accelerators and curing agents. The resulting compound is useful in encapsulating components exposed to deep sea environments. One such specific compound includes the following constituents:

Parts per 100 by weight of an elastomeric isobutylene-isoprene copolymer containing reactive chlorine

| | |
|---|---|
| 50 | filler |
| 10 | lead monoxide |
| 1 | flaked stearic acid |
| 3 | polyethelyene plasticizer |
| 2/1.5 | diphenylguanidine and 2-mercaptoimidazoline accelerators |
| 1 | magnesium oxide activator and |
| 5 | zinc oxide curing agent. |

3 Claims, No Drawings

ENCAPSULATING ELASTOMERIC COMPOUND

CROSS-REFERENCE TO RELATED APPLICATION

This application is a continuation-in-part of our application Ser. No. 731,278 filed May 22, 1968 for Encapsulating Elastomeric Compound now abandoned.

The invention described herein may be manufactured and used by or for the Government of the United States of America for governmental purposes without the payment of any royalties thereon or therefor.

BACKGROUND OF THE INVENTION

The present invention relates generally to improvements in elastomeric materials, and more particularly pertains to new and improved materials for encapsulating components employed underwater to prevent penetration of sea water therethrough at great depths.

DESCRIPTION OF THE PRIOR ART

Those concerned with the development of encapsulating compounds have long recognized the need for compounds that would be effective even when exposed to sea environments at great depths. Presently available elastomeric compounds for such purposes employ neoprene rubber, and have been found to be unsatisfactory. Service trials and exposure indicate that the life of hydrophones having boots of neoprene rubber is at best only 1 year. Further investigation has disclosed that the boot is, or becomes, too permeable in water to be capable of protecting the piezoelectric elements of the hydrophone for the required 5 to 10 years of necessary service life. Hydrophone boot materials must also meet other requirements. Thus, what is needed is a rubber combining the following properties:
1. A low permeability to and nonvulnerability by water.
2. Freedom from sulfur, where sulfur is to be understood as elemental sulfur customarily used as a vulcanizing agent, and not chemically bound sulfur such as, for instance, sulfur present in the 2-mercapts imidazoline commonly used in rubber vulcanizates. It has been the experience of the Navy and others that such sulfur corrodes the silver electrodes of the hydrophone elements.
3. Good acoustic properties, including an acoustic impedance (defined as the product of density and sound velocity) which is close to the acoustic impedance of water, not too high sound absorption, and capability of being molded without air entrapment. Air entrapment causes sound scattering or, in certain cases, acoustic resonance and accelerated depradation.
4. Good flow and extrusion characteristics to enable easy processing into forms of intricate shapes and free of air bubbles and good knitting, where knitting is defined as flowing together of stock surfaces.
5. Resistance to castor oil or other oil used inside the hydrophone.
6. Good bonding to metal characteristics.

While compounds having some of these characteristics are experimentally available, a material having a combination of all of these is not presently available.

SUMMARY OF THE INVENTION

The general purpose of this invention is to provide an elastomeric encapsulating material useable at great ocean depths without appreciable water penetration while providing a protective boot. To attain this, the invention contemplates a specific formulation of ingredients for use in conjunction with an isobutyleneisoprene copolymer containing reactive chlorine.

An object of the present invention is to provide an inexpensive, easily formulated elastomeric encapsulating material which is useable underwater without appreciable water penetration therethrough and also meets the other requirements cited above and which will serve as a protective coating for exposed components.

Other objects and many of the attendant advantages of this invention will be readily appreciated as the same becomes better understood by reference to the following detailed description.

DESCRIPTION OF THE PREFERRED EMBODIMENT

Fabrication of the elastomeric encapsulating compound is initiated by masticating a copolymer of Enjay's HT 10-66, which is a chlorinated isobutyleneisoprene copolymer with 1.1 to 1.3 percent weight percent chlorine and 1.4 mole percent unsaturation on a tightly set mill which also includes a small rolling bank. The mixing temperature is not permitted to exceed 300° F. during the process and for this purpose the simplest expedient is to cool the rollers by the internal circulation of water therethrough. The rolling bank is employed to reduce as much as possible the nerve and lacing inherent in all such worked materials.

Approximately 25 parts by weight (of the copolymer) of a general purpose filler such as furnace black is poured on the rollers of the bank after mastication of the copolymer. Thereafter the following are added in sequential order to the bank after the prior material has been dispersed:
10 parts lead monoxide
1 part stearic acid and
3 parts low moleculer weight polyethylene. molecular When these have been thoroughly dispersed, another 25 parts of the filler is added to the bank. This is followed by:
2 parts diphenylguanidine
1 part magnesium oxide
1.5 parts 2-mercaptoimidazoline
5 parts of zinc oxide After this final dispersion, the stock or resulting mixture is removed from the rollers and is molded and cured for approximately 60 to 90 minutes at a temperature range of 300° to 320° F.

It should be noted that the raw stock exhibits a viscosity of 21 inch/pounds and a scorch time of 3 minutes. The specific preferred ingredients and their physical properties are as follows:

copolymer—chlorinated isobutylene isoprene Enjay clorobutyl HT-10-66 which contains 1.1 to 1.3 weight percent chlorine and 1.4 mole percent unsaturation filler—general purpose furnace black, which is odorless and in the form of black pellets, nigrometer color 97, sp. gr. 1.80 activators—lead oxide-crystalline powder sp. gr. 9.1–9.7 magnesium oxide-free flowing powder, low copper and manganese content sp. gr. 3.32 activator/plasticizer—stearic acid-white flake powder, sp. gr. 0.84, m.p. 126°–133° F.

plasticizer—polyethylene-low molecular weight polymer sp. gr. 0.920–0.930 at 25° C.

accelerators—diphenylguanidine sp. gr. 1.2, m.p. 144°–146° C.

white-gray powder sp. gr. 1.42, m.p. 195° C., flash point 485° F.

curing agent—zinc oxide

Various evaluations and tests were performed on the above-described compound after curing at different temperatures and for various times. The following is a summary of such results at 310° F.

CHART I

| | Cure Temp 310° F. | | | | |
|---|---|---|---|---|---|
| Time | 30 | 45 | 60 | 75 | 90 |
| Tensile, Max. (p.s.i.) | 1710 | 1655 | 1560 | 1580 | 1585 |
| Modulus-100% (p.s.i.) | 267 | 314 | 350 | 346 | 377 |
| Modulus-300% (p.s.i.) | 1210 | 1230 | 1500 | 1460 | 1460 |

| | | | | | |
|---|---|---|---|---|---|
| Elongation, Max. (%) | 433 | 440 | 320 | 350 | 350 |
| Tear Strength (p.p.i.) | 33.6 | 33.0 | 22.9 | 22.4 | 21.4 |
| Shore "A"-instant (pts) | 60 | 60 | 60 | 60 | 60 |
| Shore "A"-15 second (pts) | 50 | 50 | 50 | 50 | 50 |
| Permeability to water at room temperature (gram water/cm.² area/cm. thickness/hr./mm. water vapor pressure | | | | | $8\times10^{-10}$ |

Obviously many modifications and variations of the present invention are possible in the light of the above teachings. It is therefore to be understood that, within the scope of the appended claims, the invention may be practiced otherwise then is specifically described.

We claim:

1. An elastomeric encapsulating compound consisting of:
   an isobutylene-isoprene copolymer containing reactive chlorine having 1.4 mole percent unsaturation and an active chlorine content between 1.1 and 1.3 percent by weight and to which the following compounding materials, expressed in parts per hundred by weight of said copolymer, have been added:
   50 parts of a general purpose furnace black,
   10 parts of lead monoxide,
   1 part stearic acid,
   3 parts low molecular weight polyethylene,
   2 parts diphenylguanidine,
   1 part magnesium oxide,
   1.5 parts 2-mercaptoimidazoline, and 5 parts zinc oxide.

2. The compound according to claim 1 wherein said active chlorine content is 1.1 to 1.3 percent by weight.

3. The method of fabricating an elastomeric encapsulating compound comprising the steps of:
   masticating a chlorine-containing isobutylene-isoprene copolymer and adding thereto the following materials in the amounts per hundred by weight of said copolymer and in the listed order during said mastication,
   25 parts of a general purpose furnace black,
   10 parts lead monoxide,
   1 part stearic acid,
   3 parts low molecular weight polyethylene, another 25 parts of said general purpose furnace black,
   2 parts diphenylguanidine,
   1 part magnesium oxide,
   1.5 parts 2-mercaptoimidazoline, and
   5 parts zinc oxide,
   maintaining the temperature of said materials while being masticated below 300° F., and
   curing and molding the resulting compound after mastication at an approximate temperature of 310° F. for a period of about 75 minutes.

* * * * *